(12) United States Patent
Li et al.

(10) Patent No.: US 9,001,117 B2
(45) Date of Patent: Apr. 7, 2015

(54) SELECTIVE FLOW VISUALIZATION OF TRACED PARTICLES

(75) Inventors: Wei Li, Princeton, NJ (US); Feng Qiu, Plainsboro, NJ (US); Daphne Yu, Yardley, PA (US)

(73) Assignee: Siemens Aktiengesellschaft, Munich (DE)

( * ) Notice: Subject to any disclaimer, the term of this patent is extended or adjusted under 35 U.S.C. 154(b) by 406 days.

(21) Appl. No.: 13/556,366

(22) Filed: Jul. 24, 2012

(65) Prior Publication Data
US 2013/0038605 A1    Feb. 14, 2013

Related U.S. Application Data

(60) Provisional application No. 61/522,303, filed on Aug. 11, 2011.

(51) Int. Cl.
*G06T 15/00*    (2011.01)
*G06T 19/00*    (2011.01)

(52) U.S. Cl.
CPC ............. *G06T 19/00* (2013.01); *G06T 2210/24* (2013.01); *G06F 2217/16* (2013.01)

(58) Field of Classification Search
CPC .... G06T 7/0081; G06T 13/60; G06T 2210/24
USPC .................................. 345/419–427, 473–475
See application file for complete search history.

(56) References Cited

U.S. PATENT DOCUMENTS

| 5,537,641 A * | 7/1996 | da Vitoria Lobo et al. ... 345/419 |
| 2008/0266286 A1 * | 10/2008 | Ramey et al. ................. 345/419 |

* cited by examiner

*Primary Examiner* — Charles Tseng

(57) ABSTRACT

A method for tracing a plurality of virtual particles through a flow filed includes receiving a flow field. A flow domain is divided into cells. Virtual particles are defined within the flow domain and values are collected for flow properties at each cell. A histogram is generated for each cell representing the collected flow properties for that corresponding cell. The histogram includes, for each of the one or more flow properties, a plurality of bins defining ranges of property values and a count of virtual particles within that cell that exhibit those properties. The histograms for the plurality of cells are advected with respect to the flow field over time. A graphical representation of the plurality of particles within the flow domain is rendered based on the advected histograms for the plurality of cells using a graphics processor.

19 Claims, 13 Drawing Sheets

SELECTIVE FLOW VISUALIZATION OF TRACED PARTICLES

CROSS-REFERENCE TO RELATED APPLICATION

The present application is based on provisional application Ser. No. 61/522,303, filed Aug. 11, 2011, the entire contents of which are herein incorporated by reference.

TECHNICAL FIELD

The present disclosure relates to flow visualization and, more specifically, to selective flow visualization of traced particles.

DISCUSSION OF THE RELATED ART

Particle tracing is the field of endeavor by which the flow of fluids through conduits is graphically represented as a set of particles that are illustrated as being in motion. Particle tracing is an effective approach for visualizing dynamic behavior in a flow field. For example, particle tracing may be used to effectively visualize the flow of blood through blood vessels for diagnostic purposes.

The flow of blood itself may be observed using medical imaging techniques such as aniography. A computer system may then be used to analyze the angiography data and to render a computer model which may be displayed to a medical practitioner such as a radiologist. Particle tracing may be used in rendering this computer model of the blood flow. Each "particle" may represent a quantity of blood or an occurrence of radiocontrast that has been injected into the bloodstream. These particles are understood to be units for the purposes of the graphical rendering and need not correlate specifically to actual particles within the bloodstream.

In the computer rendering, the set of particles are displayed. At each time step, each particle inside a flow field is moved, or advected using the terminology of computational fluid dynamics (CFD) according to the velocity direction and magnitude at the position of the particle, as determined by the flow field characteristics, which may have been derived from angiography data. At the next step, the particle is advected again from its new location. The advection speed of particles is proportional to the velocity magnitudes at the corresponding locations. Therefore, animations of particle tracing exhibit intuitively the dynamic behavior of the flow, such as acceleration.

By rendering the particle tracing visualization, flow pattern remains may then be evaluated as a qualitative impression. The quality of the rendering may be increased by increasing the number of tracked particles. However, tracing a large amount of particles may be expensive in both computation time and memory requirement, while visualizing and emphasizing quantitative information may be difficult.

SUMMARY

A method for tracing a plurality of virtual particles through a flow filed includes receiving a flow field encompassing a flow domain. The flow domain is divided into a plurality of cells. A plurality of virtual particles is defined within the low domain. One or more values are collected for flow properties at each of the plurality of cells. A histogram is generated for each of the plurality of cells representing the collected one or more flow properties for that corresponding cells. The histogram includes, for each of the one or more flow properties, a plurality of bins defining ranges of property values and a count of virtual particles within that cell that exhibit those properties. The histograms for the plurality of cells are advected with respect to the flow field over time. A graphical representation of the plurality of particles within the flow domain is rendered based on the advected histograms for the plurality of cells using a graphics processor.

The flow filed may include a mathematical description of flow properties observed within the flow domain. The flow domain may be a blood vessel segment, the flow field may be a description of blood flow through the blood vessel segment, and the flow field may be acquired using angiography techniques.

The plurality of cells may include a uniformly spaced rectilinear cell grid with a Cartesian volume. The defining of the plurality of virtual particles may include creating a simulation of how particles would flow through the flow domain given the flow field.

The one or more values for flow properties may include one or more of particle density, particle speed, particle directions, visitation frequency, particle age, particle origin, or surface collision statistics.

The generated histogram may be a multivariate histogram for storing a plurality of flow properties. Advecting the histograms may include calculating how each histogram changes from time step to time step based on the flow field. Rendering the graphical representation of the plurality of particles may include generating a 3D flow field simulation. The generated 3D flow field simulation may be animated over time. Rendering the graphical representation of the plurality of particles may include mapping selected scalar values of interest to a color lookup table. The selected scalar values may include one or more of an average, mean, minimum, maximum. The selected scalar values may be plotted as a 2D graph with reference to time steps.

The rendered graphical representation of the plurality of particles within the flow domain may be displayed on a display device. Rendering the graphical representation of the plurality of particles within the flow domain may be limited to a subset of particle property values selected based on user input.

The generated and advected histograms may be stored in a linked-bins data structure.

The size of each of the plurality of cells may be set relatively small when greater accuracy is desired and relatively large when greater computational efficiency is desired.

A method for tracing a plurality of virtual particles through a flow filed includes receiving a flow field encompassing a flow domain. The flow domain is divided into a plurality of cells. A simulation of a plurality of virtual particles placed at an inlet of the flow domain is defined. A statistical representation for each of the plurality of cells representing one or more flow properties for that corresponding cells is generated. How the statistical representation for the plurality of cells change over time as a result of the flow field is determined. A graphical representation of the plurality of particles within the flow domain is generated based on the statistical representation for the plurality of cells over time using a graphics processor.

The statistical representation may include a histogram for each of the plurality of cells representing the collected one or more flow properties for that corresponding cells. The histogram may include, for each of the one or more flow properties, a plurality of bins defining ranges of property values and a count of virtual particles within that cell that exhibit those properties.

A computer system includes a processor and a non-transitory, tangible, program storage medium, readable by the computer system, embodying a program of instructions executable by the processor to perform method steps for tracing a plurality of virtual particles through a flow filed. The method includes receiving a flow field encompassing a flow domain. The flow domain is divided into a plurality of cells. A plurality of virtual particles is defined within the flow domain. One or more values for flow properties are collected at each of the plurality of cells. A statistical representation for each of the plurality of cells representing the collected one or more flow properties for that corresponding cells is generated. The statistical representation for the plurality of cells is advected with respect to the flow field over time. A graphical representation of the plurality of particles within the flow domain is rendered based on the advected statistical representation for the plurality of cells.

The statistical representation may include a histogram for each of the plurality of cells representing the collected one or more flow properties for that corresponding cells. The histogram may include, for each of the one or more flow properties, a plurality of bins defining ranges of property values and a count of virtual particles within that cell that exhibit those properties.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

Figure 1:
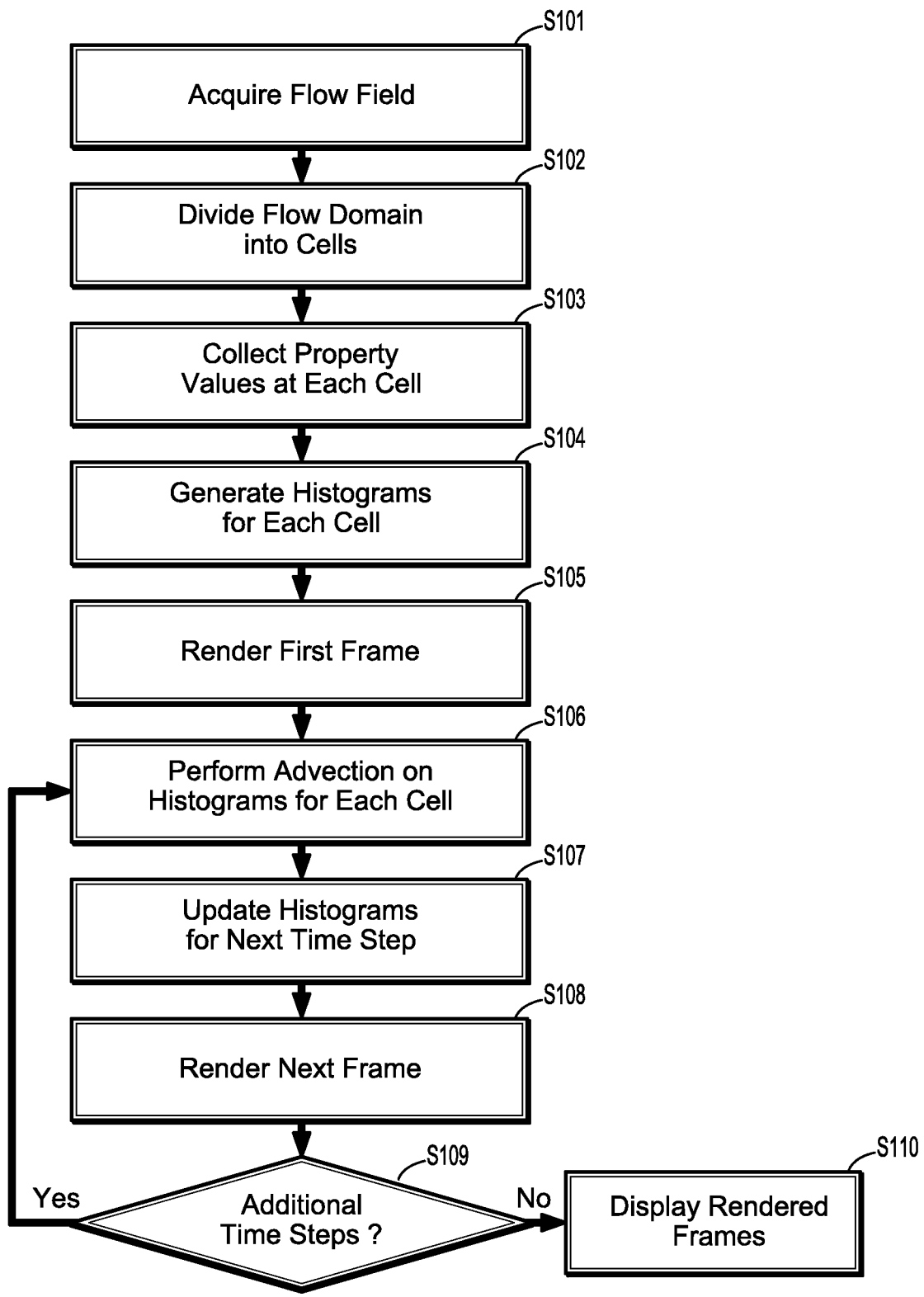
FIG. 1 is a flowchart illustrating an approach for performing particle tracing in accordance with exemplary embodiments of the present invention.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention perform particle tracing, for example, of the flow of blood through vessels, with a very high quality while reducing the computational expense associated with tracking a large amount of particles. Moreover, exemplary embodiments of the present invention provide approaches for quantitative analysis of flow characteristics.

High quality renderings may be provided by performing particle tracing using a relatively high number of particles, for example several millions of particles may be used in a 3D flow field. Instead of advecting and tracing individual particles, exemplary embodiments of the present invention may calculate statistical representations of the particles found within the various sections of the vessel being studies. Advection may then be performed on the statistical representations directly. Statistics of these tracked particle properties may then be computed. The statistical representations may then be visualized through volume rendering to highlight regions of interest. A user may select the property statistics that are of interest and the histograms may be representative of the user-selected statistics.

According to some exemplary embodiments of the present invention, the statistical representation of particles may be embodied as histograms, such as multivariate histograms in which multiple different property values may be included. Advection may then be performed on the histograms and visualization of the traced particles may be based on the advected histograms. While exemplary embodiments of the present invention may be described herein with reference to the use of histograms, it is to be understood that other forms of statistical representation may be used.

FIG. 1 is a flowchart illustrating an approach for performing particle tracing in accordance with exemplary embodiments of the present invention. First, a fluid flow field may be acquired (Step S101). The fluid flow field may be a mathematical description of how the fluid progresses through a section of one or more conduits, herein referred to as a "flow domain." For example, where particle tracing of blood flow is desired, the fluid flow filed may describe the manner in which blood flows through a vessel segment. The fluid flow filed may be derived, for example, based on angiography data. However, exemplary embodiments of the present invention do not require that the fluid flow filed be so acquired and indeed exemplary embodiments of the present invention may take as input the fluid flow filed and need not be concerned with its manner of acquisition.

Figure 2:
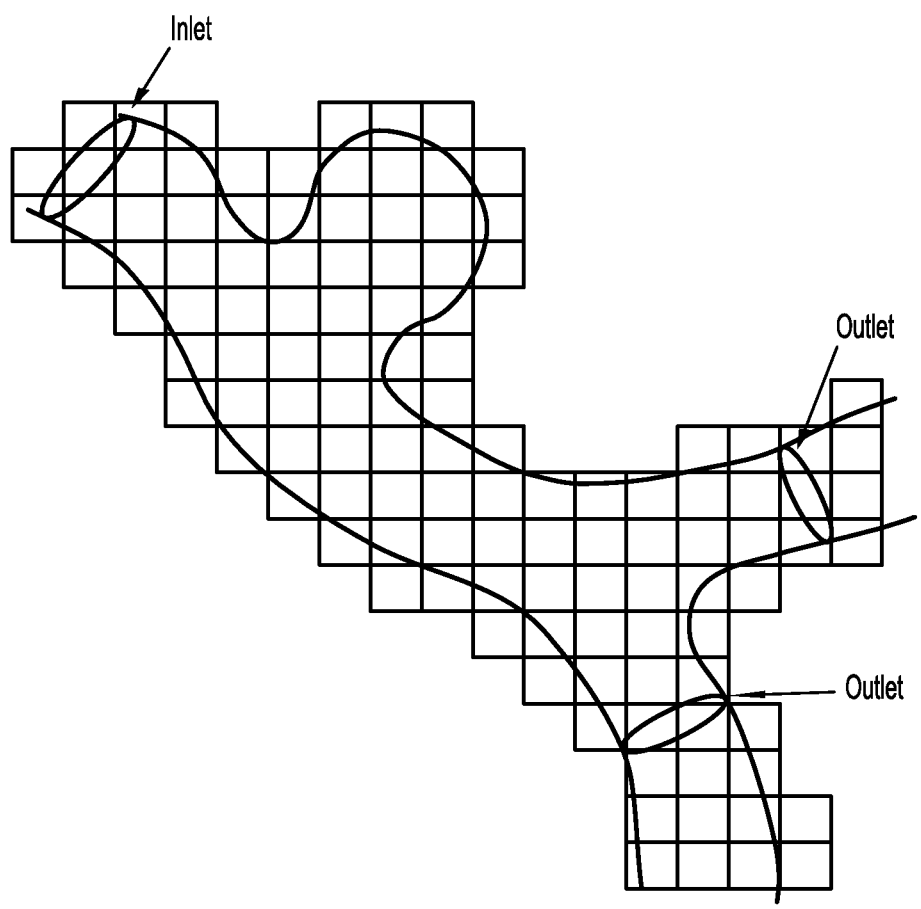
FIG. 2 is a diagram illustrating a vascular flow domain divided into a plurality of cells in accordance with exemplary embodiments of the presenting invention.

As described above, the acquired fluid flow filed may be descriptive of the manner of flow through a particular flow domain. The flow domain may be divided into a plurality of cells (Step S102). For example, the flow domain may be divided into a uniformly spaced rectilinear cell grid within a Cartesian volume. The flow domain may be divided into, for example, 100 cells in each direction. As the flow domain and the fluid flow field may be three-dimensional, each cell may be a three-dimensional shape, such as a cube. In this way, the flow domain may be divided into a grid of cubes. FIG. 2 is a diagram illustrating a vascular flow domain divided into a plurality of cells in accordance with exemplary embodiments of the presenting invention. As may be seen from this figure, the flow domain is a vessel segment and it is divided into a sequence of cells.

Then, at each cell, property values for particles falling within these cells may be collected (Step S103). The property values may include any desired characteristics for the particles within that cell. As described above, these property values may be derived from the acquired flow field. The property values may include, for example, one or more of a count of particles within the cell, an approximate particle density within the cell, speed for particles within the cell, vectors of motion for particles within the cell, etc.

Additional property values may include a visitation frequency, which may be defined as the number of particles visited each cell over a certain period of time or the particle age as it visits a cell based on the time step since it has been injected from the inlet. The origin of the particle may also be labeled with an ID and a property value may include a record, in each cell, of the origin ID of the visited particles.

Another property of interest can be that the cells that intersect certain structural walls can be labeled to collect surface collision statistics. In fact, any desired property may be obtained for the particles with respect to each cell.

For each cell, a histogram may be generated for more succinctly describing the collected properties of that cell (Step S104). The histogram may thus include a set of value bins for each value and a quantity of values falling within each bin. In this regard, the histogram need not contain all of the property value information, but may more simply contain a number for values that fall within each bin. Extraneous information may then be discarded. There may be one histogram generated for each property value for each cell for each time step. For example, the property value may simply be a measure of particle velocity within each cell. In such an example, the histogram may be a count of how many particles within the cell fit into various bins, where each bin corresponds to a range of velocities. Of, say, 1000 particles, Table I may be used to represent an exemplary histogram:

TABLE I

| BIN | RANGE | QUANTITY |
| --- | --- | --- |
| Bin 0 | 0 ≤ velocities < 10 | 50 |
| Bin 1 | 10 ≤ velocities < 20 | 250 |
| Bin 2 | 20 ≤ velocities < 30 | 500 |
| Bin 3 | 30 ≤ velocities | 200 |

As may be seen from Table I, where velocity is provided as the property value of interest, for each cell, such a histogram may be created. Where there are additional property values of interest, a multivariate histogram may be established for each cell to include any number of desired properties. The full set of information for each particle may thereafter be discarded and the histograms themselves may be used to produce the renderings.

After a histogram has been generated for each cell, the system may be advected. Advection is the process of incrementing the particles to the next time step based on the acquired flow field. In general, each particle may be independently advected. However, exemplary embodiments of the present invention may advect each histogram for each cell rather than advecting each particle. Advection may be performed for each time step for the entire desired length of time. A three-dimensional model of the particle flow may then be rendered based on the histograms. Exemplary embodiments of the present invention may either advect through all time steps prior to rendering the three-dimensional model for visualizing the flow or a frame for each time step may be rendered after each advection. The description herein will focus primarily on the latter technique although the former technique should also be understood to fall within the present invention. In fact, the present invention is flexible with respect to the order of advection, modeling, and display of the model.

According to exemplary embodiments of the present invention, a three-dimensional model of the system at the first time step may be rendered (Step S105). This rendering may be generated either from the location of each particle within the flow domain or it may be rendered from the cell histograms of the first step. Rendering from cell histograms may include using the histogram data rather than the full data of each particle, to construct a visual model of the particles though the flow field.

The system may then be advected to the next time step (Step S106). As discussed above, advection may be performed by applying the dynamics of the acquired flow field directly to each histogram.

Either prior to or after advection, the properties may be updated to the new time step according to the acquired flow field and the histograms may accordingly be updated (Step S107).

Thereafter, the state of the system at the second time step may be rendered (Step S108). Here the rendering is performed from the advected histograms as the individual particles themselves have not been advected. Thus, the dynamics of the acquired flow field are not applied directly to each particle.

It may be understood that advection of a particle includes calculating a new location for each particle based on the dynamics of the acquired flow field. According to exemplary embodiments of the present invention, a histogram may be advected by determining a new cell for each bin of the histogram being advected and then adding the tally of that bin to the histogram for the new cell. For example, where the histogram being advected is the example shown in Table I, the acquired flow field may be used to determine in which new cell the 50 particles of the given cell having velocities within the range of zero and 10 will wind up at the next time step and at what velocity these cells will be at when they arrive. Then this information may be used to update the histogram at the new cell. This process may be repeated for each bin. Where the bins of the histogram do not impact which bin the particles will end up in, for example, where the bins represent different particle ages, the entire histogram may be advected all at once instead of bin-by-bin. It should be understood, however, that the acquired flow field is used only to determine where particles of the given ranges of the histogram will wind up, not where particular particles will wind up. In this way, computational expenses may be significantly reduced. For example, as it is only the histogram that is advected and not each particle, the computational expense would be independent of the number of particles in the system and would instead depend upon the number of cells that the flow domain is divided into. This stands in contrast to other approaches in which the flow domain is not divided into cells and the computational expense increases as the number of particles increases.

It may then be determined if there are additional time steps remaining (Step S109). If there are additional time steps (Yes, Step S109), then the steps of advecting the histograms (Step S106), the updating of the histograms (Step S107), and the rendering the system (S108) may be repeated until there are no more time steps remaining and the sequence has been rendered through the entire desired length of time (No, Step S109). Thereafter, the sequence of rendered frames may be displayed (Step S110). It should also be noted that each frame may be displayed as it is rendered rather than displaying all frames after all frames have been rendered. However, this approach may require a sufficiently fast image processing hardware to advect and render the frames in real-time.

Figure 3:
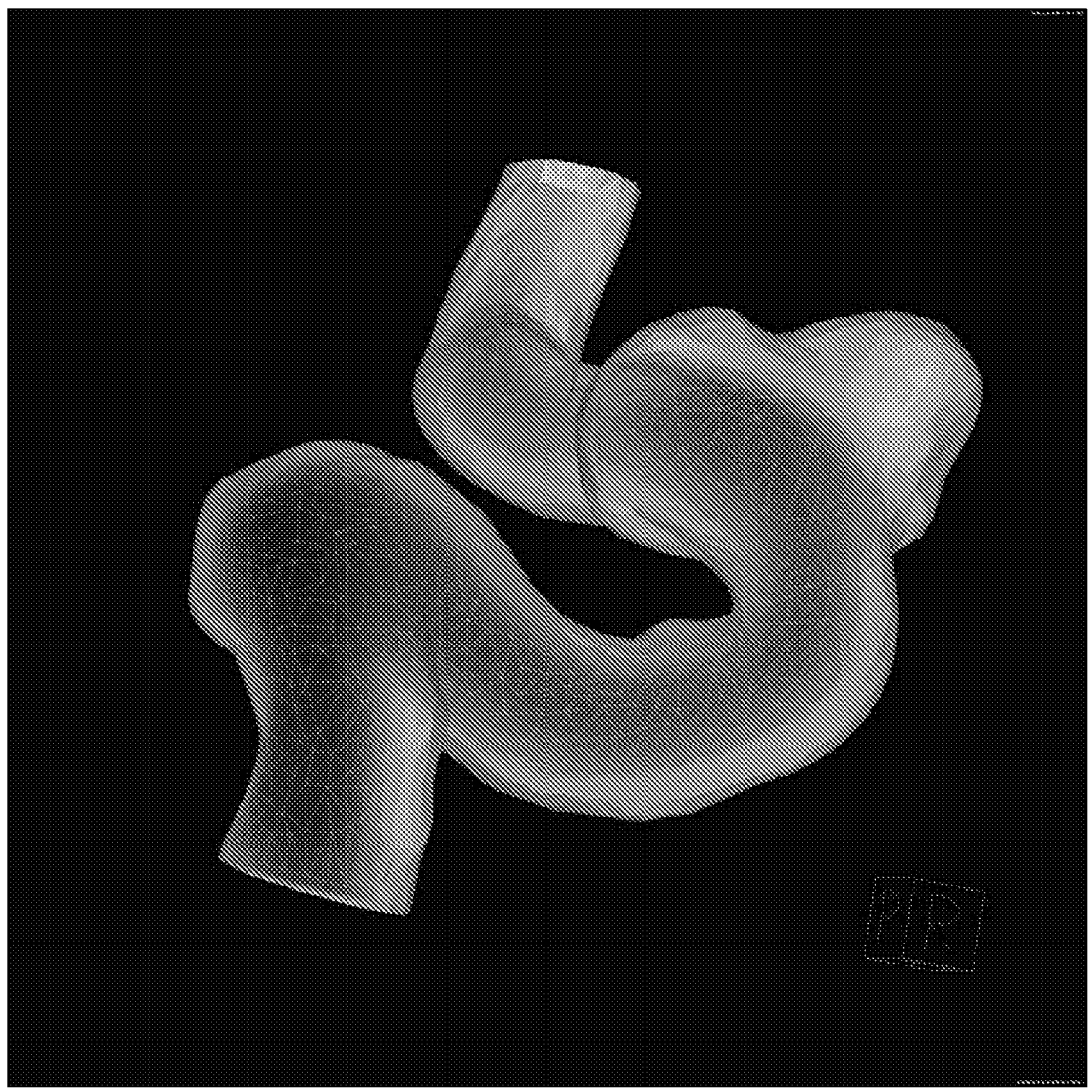
FIG. 3 is a rendering illustrating advection of a blood density volume in accordance with an exemplary embodiment of the present invention.
Figure 4:
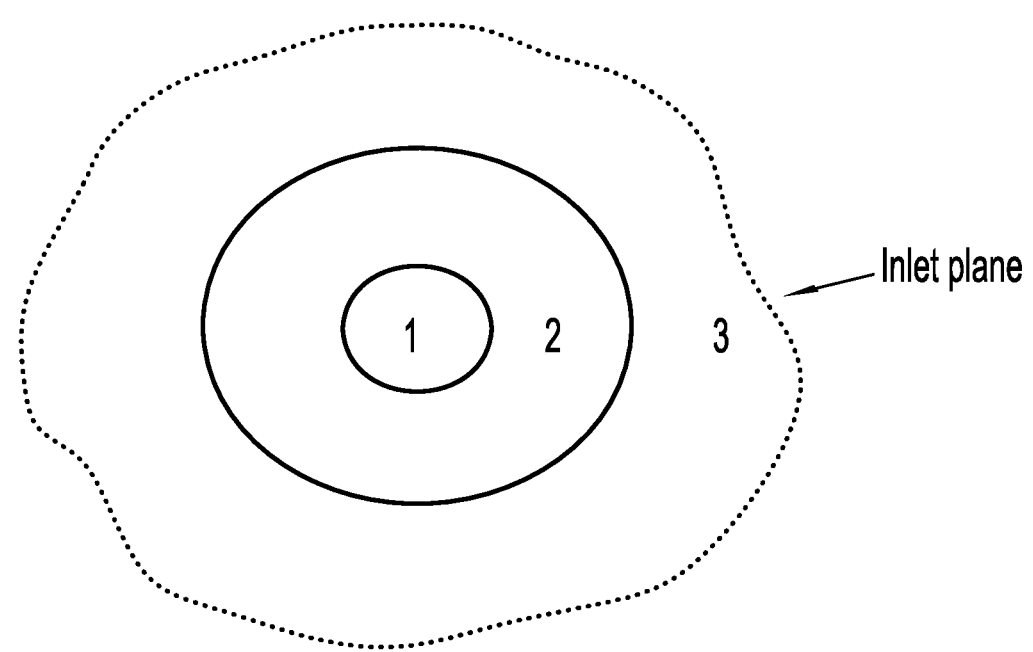
FIG. 4 is a rendering illustrating an inlet plane labeled with IDs 1-3 corresponding to distinct concentric partitions of the inlet in accordance with exemplary embodiments of the present invention.

The rendering of the image frames may include an introduction, virtually, of a dye into the flow domain, for example, at the inlet of the vessel segment being imaged. The dye may be represented by a set of tiny particles. It may be these particles of dye that are treated as the traced particles, the histograms of which are advected. Then, at each frame, rendering may include generation of dye at each cell in accordance to the updated and advected state of the corresponding histogram. The rendering may include rendering by mapping the histogram values directly to voxel opacity. For example, where the selected property value is density, the rendering may produce a three-dimensional model of blood density through the vessel section, with more opaque voxels representing more dense blood flow. FIG. 3 is a rendering illustrating advection of a blood density volume in accordance with an exemplary embodiment of the present invention.

Where the selected property value is an origin ID representing where particular particles entered the inlet of the vessel segment, the rendering may include particles colored according to the origin IDs of their corresponding spatial location on the inlet. The manner in which different inlet IDs are mapped to the rendering may be arbitrarily defined. FIG. 4 is a rendering illustrating an inlet plane labeled with IDs 1-3 corresponding to distinct concentric partitions of the inlet in accordance with exemplary embodiments of the present invention. A rendering such as this may be used to visualize the manner in which blood flows through the vessel segment.

Figure 5:
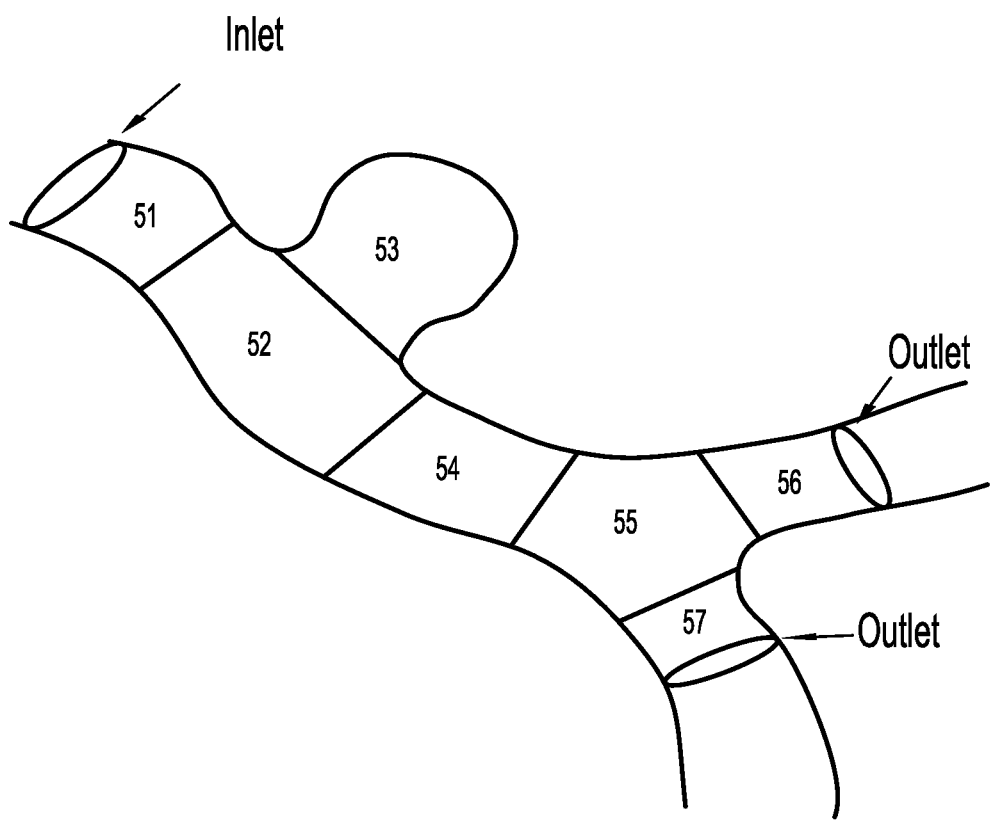
FIG. 5 is a diagram illustrating the partitioning of cell region each having their own set of attributed properties within a vascular segment in accordance with exemplary embodiments of the present invention.

Particle properties may also be associated dynamically. For example, specific properties may be associated with particular cells or groups of cells such that as particles enter each cell, the properties associated with that particular cell are assessed and carried along with the particles. FIG. 5 is a diagram illustrating the partitioning of cell region each having their own set of attributed properties within a vascular segment in accordance with exemplary embodiments of the present invention. A segment ID may be tagged to each particle that is found within the cells of the corresponding cell groups (segments 10-70). Rendering may thereafter assign one or more colors to the particles based on the associated segment IDs so that a viewer may deduce from this rendering what segments blood particles have traveled through and this information may be used to diagnose irregular patterns of back flow, e.g. when particles from region 30 re-enters region 10.

As described above, exemplary embodiments of the present invention derive computation efficiency by associating a histogram to each voxel of the volume for each property collected. Collection of multiple properties may be used to establish a multivariate histogram volume. Each histogram may be composed of a set of bins. Each bin may be mapped to a range of property values or a combination of multiple ranges and records the count or density of particles satisfying the criteria of the bin. In performing this approach, it may be observed that the particle distribution tend to be non-uniform. This phenomenon may be especially pronounced when classifying values into bins as most of the bins may contain no particles. Therefore, exemplary embodiment of the present invention may utilize an on-demand storage for the histograms, which may dramatically reduce memory requirement. This concept is described in greater detail below, for example, with reference to FIG. 8 and FIG. 9.

Accordingly, rather than tracing individual particles, histograms associated with cells may be traced. This approach may provide the capability of simulating the result of tracing large amount of particles with much less computation efforts. The computation time and memory usage may be proportional to the total number of cells, and may not be influenced by the number of particles while the computation cost of particle tracing is proportional to the number of particles. It may therefore be possible to effectively trace a system having an infinite number of particles by tracing the cell histograms rather than the particles themselves. The statistical properties of the traced particles converge to the real solution as the resolution of the volume grid increases. This stands in contrast to alternative approaches such as the use of a Monte Carlo-based method to compute the statistical properties, which converges to the real solution as the number of traced particles increases.

Exemplary embodiments of the present invention may also utilize adaptive resolution volume to reduce memory usage as well as to improve tracing accuracy. This concept is described in greater detail below.

Additionally, tracing of histograms for particular cells may be easily implemented as volume rendering. Tracing of individual particles is often implemented as rendering distinct geometries. As particles may be visualized as semi-opaque and partially transparent, modern graphics processing hardware may more easily handle partially transparent volume rendering than partially transparent geometry rendering and accordingly, techniques associated with exemplary embodiments of the present invention may make more efficient use of modern graphics processing hardware as partially transparent volumes is natural to volume rendering.

Figure 6:
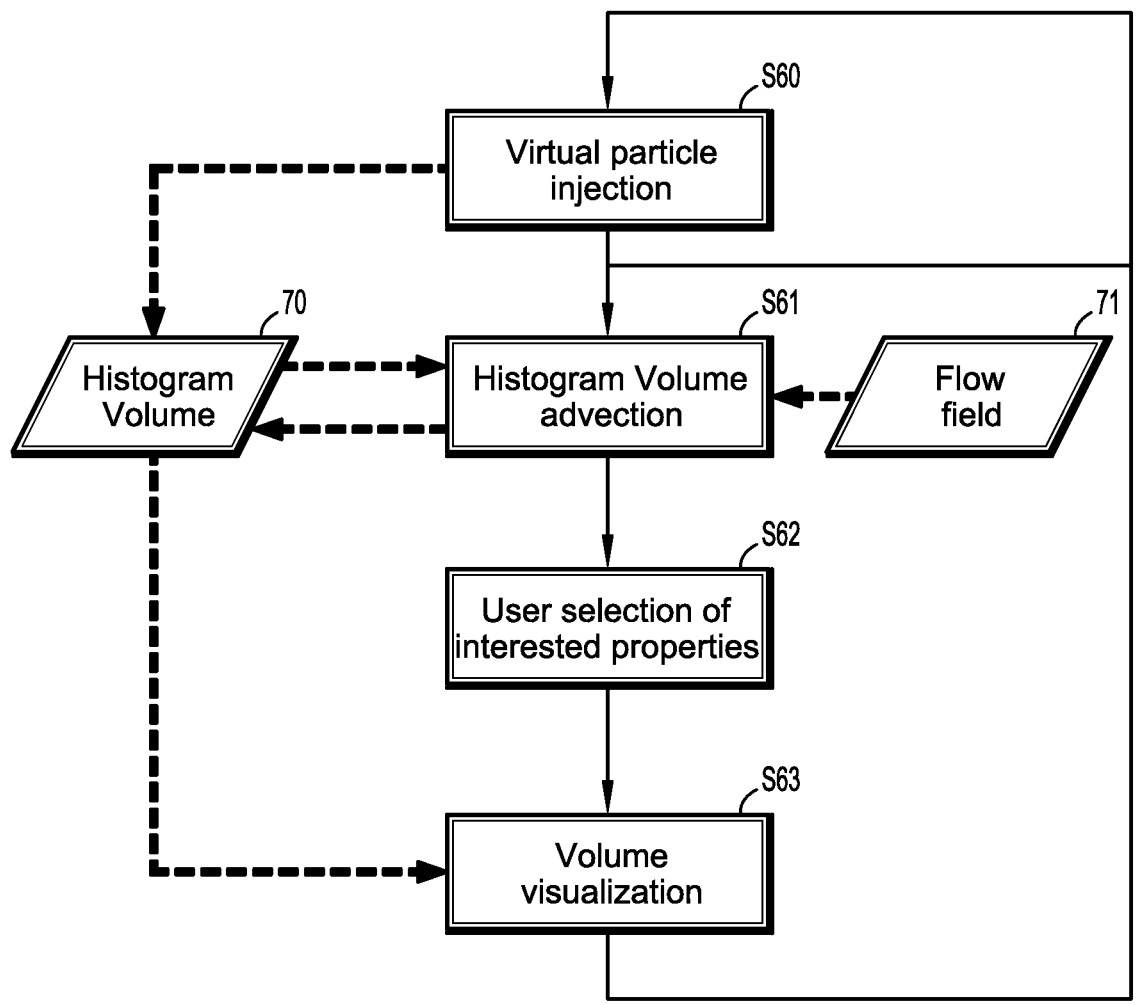
FIG. 6 is a flow chart illustrating an approach for using multivariate histogram volumes to trace and visualize particles in accordance with exemplary embodiments of the present invention.

According to exemplary embodiments of the present invention, multivariate histogram volumes may be used to provide a more efficient way of tracing and visualizing very large numbers of particles of various classifications. FIG. 6 is a flow chart illustrating an approach for using multivariate histogram volumes to trace and visualize particles in accordance with exemplary embodiments of the present invention. Here, solid arrows indicate the sequential order of the steps; while dashed arrows depict data flow (read or write). As shown in FIG. 6, the histogram volume 70 is a central data structure. The histogram volume 70 is a volumetric structure composed of cells, and each cell is associated with a histogram representing the count or density of particles inside the cell and satisfying certain criteria. At the first stage, virtual particles are injected into the flow field (Step S60), which modifies the histograms of the cells at the inlet locations. The injecting of the virtual particles may include the defining of the plurality of particles that may be graphically represented, but do not really exist.

As described above, the flow filed 71 may be provided from an external source. Next, the histogram is advected according to the flow field (Step S61). A user may then select one or more properties of interest (Step S62). The user-selected properties in the histogram may then be visualized through volume rendering (Step S63). The work flow may then return to injection (Step S60) or advection (Step S61). The frequencies of injection and advection may be independent.

The accuracy of tracing may depend upon the resolution of the grid. The higher the resolution of the grid, the smaller the cells, and the more accurate the tracing may be. However, increasing the grid resolution typically corresponds to increasing memory requirement as well as computation. Particles moving in a flow field usually are not uniformly distributed. Particles may occupy only a small percentage of the whole volume. Therefore, an adaptive hierarchical structure may be utilized for the storage of the histogram.

Figure 7:
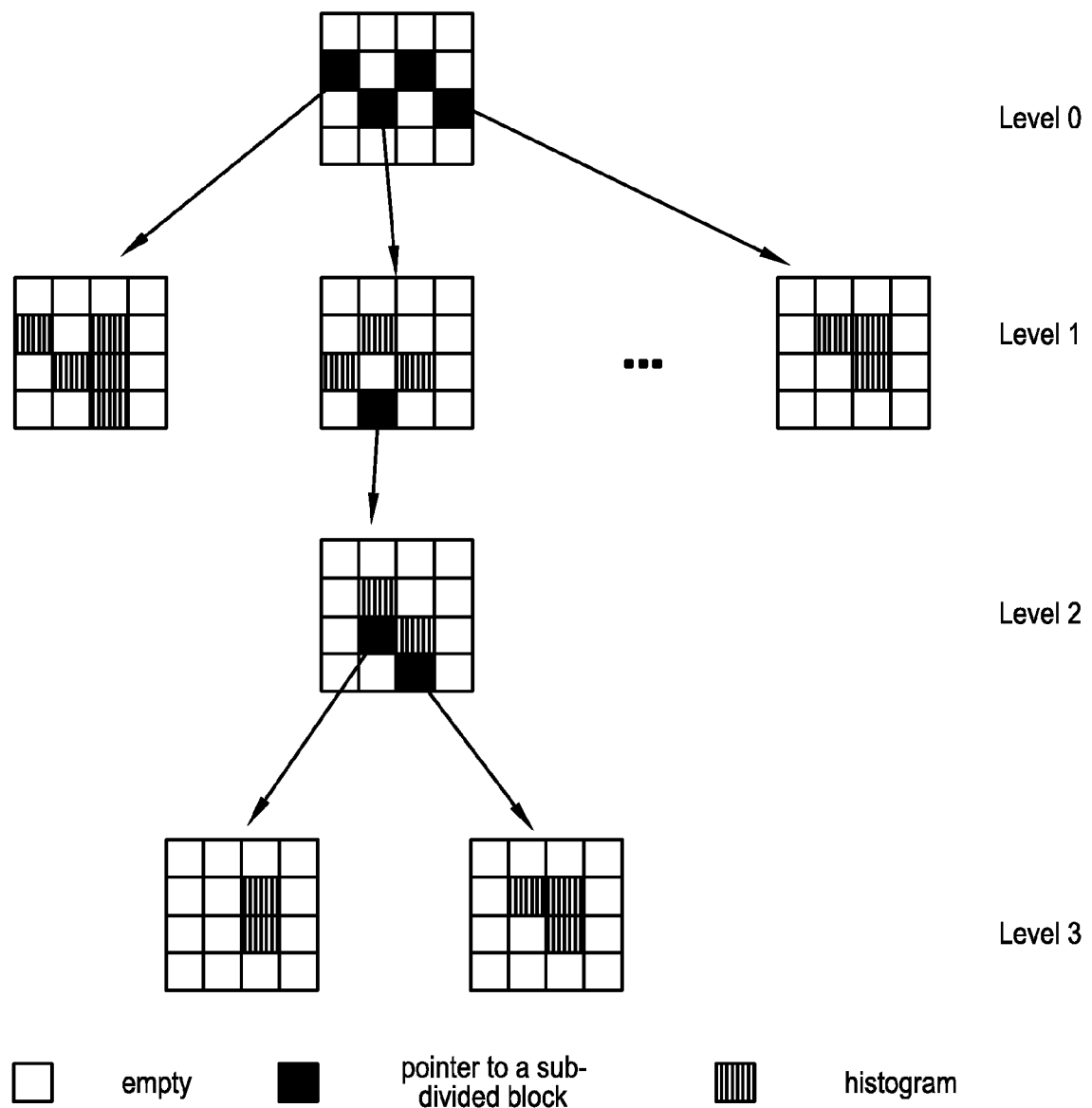
FIG. 7 is a two-dimensional illustration of adaptive hierarchical histogram volume that may be used in accordance with exemplary embodiments of the present invention.

FIG. 7 is a two-dimensional illustration of adaptive hierarchical histogram volume that may be used in accordance with exemplary embodiments of the present invention. The structure is composed of multiple levels, for example, level 0 through level 3. While shown here as having only four levels, the design is not limited thereto and any number of levels may be accommodated. The choice of the number of levels used may be determined based on performance and memory consumption. The histogram volume may be partitioned into blocks, each representing a group of cells of the flow domain. Only the blocks that contain non-empty cells need storage allotments. The white boxes represent empty blocks or cells, and the boxes with vertical lines indicate histogram associated with cells. The solid boxes indicate a pointer to a subdivided block in the next level. Sub-division may be performed repeatedly at certain regions until the desired resolution is achieved. For example, the regions near the vessel boundary may be subdivided to achieve better spatial accuracy.

Exemplary embodiments of the present invention may utilize a data structure for storing the histogram volume which may be referred to herein as "linked-bins." Linked-bins can be thought of as a multiple dimensional extension of a linked-list.

Figure 8:
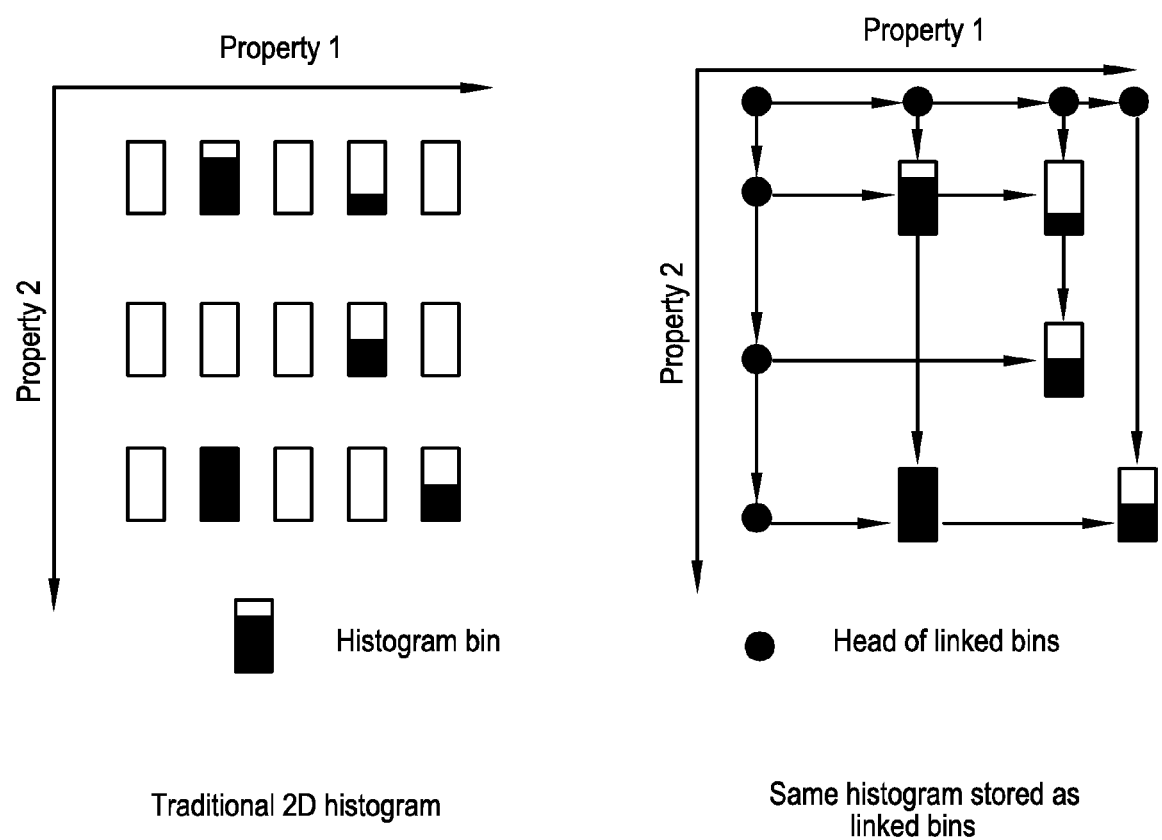
FIG. 8 is a diagram comparing linked bins against traditional histogram using a two-dimensional example.

FIG. 8 is a diagram comparing linked bins against traditional histogram using a two-dimensional example. The left part of the figure is a traditional histogram arranged according to two properties. The right part of the figure shows the same information stored in linked-bins. It should be noted that the approach of linked-bins has no limit on the number of properties that may be used. A two-dimensional example is offered solely for illustration purpose, and it is to be understood that this structure may be used for three-dimensional examples as well. In linked-bins, heads may be added as in linked list. Each bin of histogram is expanded with n pointers, where n is the number of properties. The $i^{th}$ pointer points to the next non-empty bin for the $i^{th}$ property or the pointer is NULL if this node is the last link for the $i^{th}$ property. Accordingly, only the non-empty bins are stored. When the non-empty bins are sparse, the storage requirement may be greatly reduced even with the overhead of the heads and pointers.

Exemplary embodiments of the present invention may also increase tracing accuracy by using distribution functions to describe the particles inside each cell instead of, or in addition to, increasing the grid resolution. The distribution function may be updated in the advection step.

Advecting histogram volume may be performed in a manner similar to the manner in which density volume is advected. For each cell in the updated volume, back tracking may be performed according to the velocity field to find the corresponding location in the previous volume that moves to the current location of the current step. Then the neighboring cells of the previous location may be found and the property values may be interpolated from the property values of the neighboring cells. In the extreme case that each histogram only has one bin, the interpolation may take the values of the bins of the neighboring cells. When a histogram has multiple bins, interpolation may be customized to be compatible for the structure used.

Figure 9:
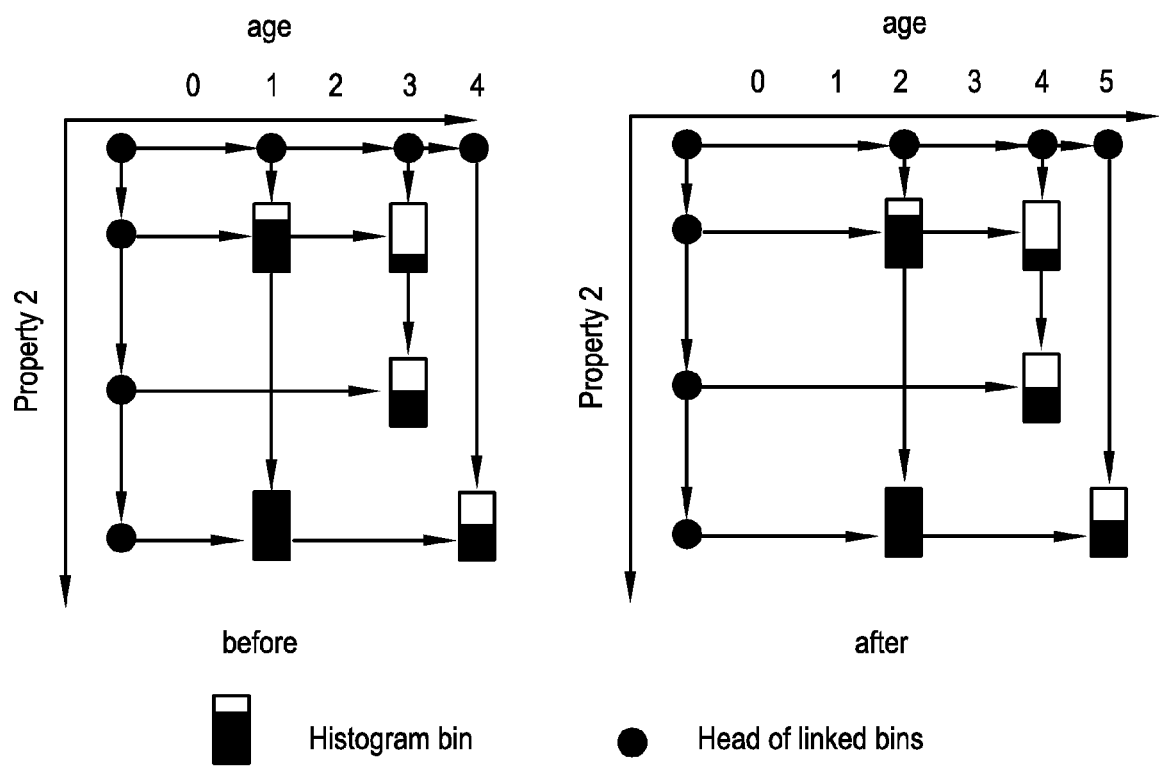
FIG. 9 is a diagram illustrating cross-bin transformation in a case in which all of the particles in any bin have the same age in accordance with exemplary embodiments of the present invention.

Before interpolation, the transformation across different bins may be performed. For example, if the age of particles is used as a property of the histogram, bins may first be updated to reflect the aging process. By using linked bins, updating of the bins may be achieved by increase the age property of all the bins. FIG. 9 is a diagram illustrating cross-bin transformation in a case in which all of the particles in any bin have the same age in accordance with exemplary embodiments of the present invention. Here, the linking structure is not affected by the aging process except the associated ages for each bins and heads increase by 1. If each bin maps to a range of ages larger than 1, proportionally densities may be moved to the bins of older ages. In this case, the linked-bins may need restructuring, as the process can create new bins and remove old bins.

After the cross-bin transformation, the bins mapped to the same range of properties from the neighboring cells may be interpolated. The results are used as the bin values of the target cell. The interpolation of bins of different ranges may be computed independently from each other. If a bin does not exist in linked-bins, it is simply assigned a zero value.

Figure 10:
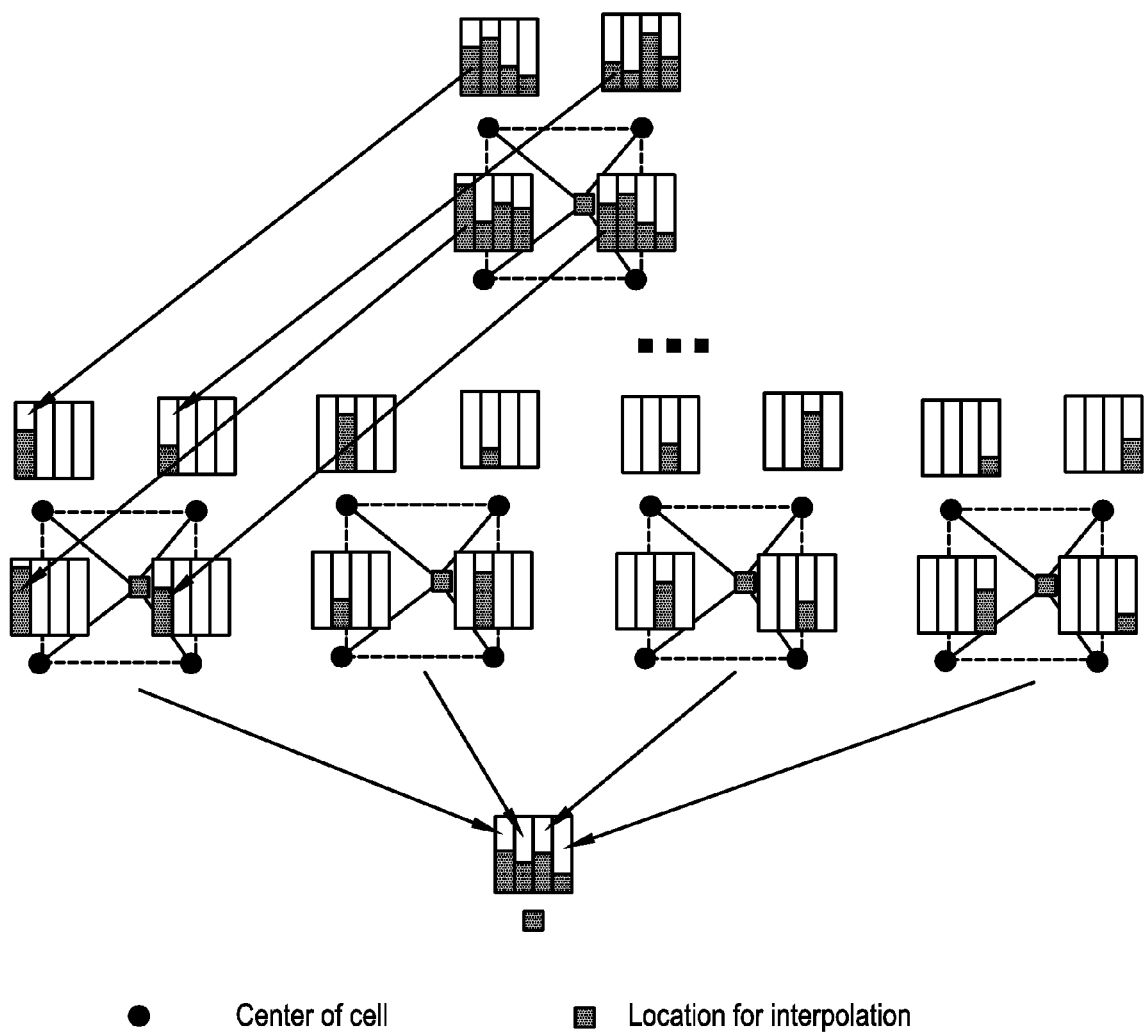
FIG. 10 is a diagram illustrating interpolation of histograms in accordance with exemplary embodiments of the present invention.

FIG. 10 is a diagram illustrating interpolation of histograms in accordance with exemplary embodiments of the present invention. Again, a two-dimensional example is illustrated for the purposes of providing a clear description. Here, the solid squares indicate the location for interpolation, while the solid circles represent centers of the four neighboring cells in two-dimensions. Each cell is associated with a histogram of four bins. Bilinear interpolation may be performed independently for each one of the four bins. The four interpolated values may be combined to fill the four-bin histogram of the interpolated location. The resulting histogram may be converted to linked-bins, where desired.

Volume rendering may provide a natural approach for visualizing the histograms. As each cell contains multiple values, it may be too cluttered to visualize all cells simultaneously. However, the information collected within the multivariate histogram volume may allow for a number of semantic queries for isolating the regions of interest. Depending on the query, a processing step to combine the query results into a new scalar volume may be used to prepare for volume rendering. For example, if the query is to highlight cells that contained particles that had been visited by particles entered region label 30 prior to re-entering region label 20 (referring to the segmentation scheme illustrated in FIG. 5), then the histogram volume may be processed to check or cells which contains region label 3 and 2 with timestamps with this sequence. These cells can be marked by the number of occurrence of such event and stored as a new scalar volume for visualization or as a mask to restrict the flow animation to remove occlusion from other regions that are not of interest. For simple queries such as to visualize the visitation frequency of each cell, the visitation frequency count may be mapped to colors in a lookup table. The scalar volume of visitation frequency and lookup table can then be used in the standard volume rendering technique except that interpolation may be performed as described above. If a cell needed for interpolation falls to an unallocated block, a zero value may be assigned to all its histogram bins.

The histogram volume approach described herein may be applicable to various kinds of flow visualization. For example, the histogram volume approach may be applied to a work flow for vascular flow visualization. Exemplary embodiments of the present invention may involve both domain-specific computation and techniques described above. In the case of vascular imaging, the selected scalar property may be further visualized by mapping on sample planes within the vascular region, or as animated Multiplanar Reformatting (MPR) technique commonly used in the medical imaging domain. The MPR plane may be further overlaid with multiple blended layers to combine multiple selected scalar properties. The property values can also be computed as statistics values on sample planes such as mean, max, average, etc. and may be visualized as two-dimensional plots over time.

Figure 11:
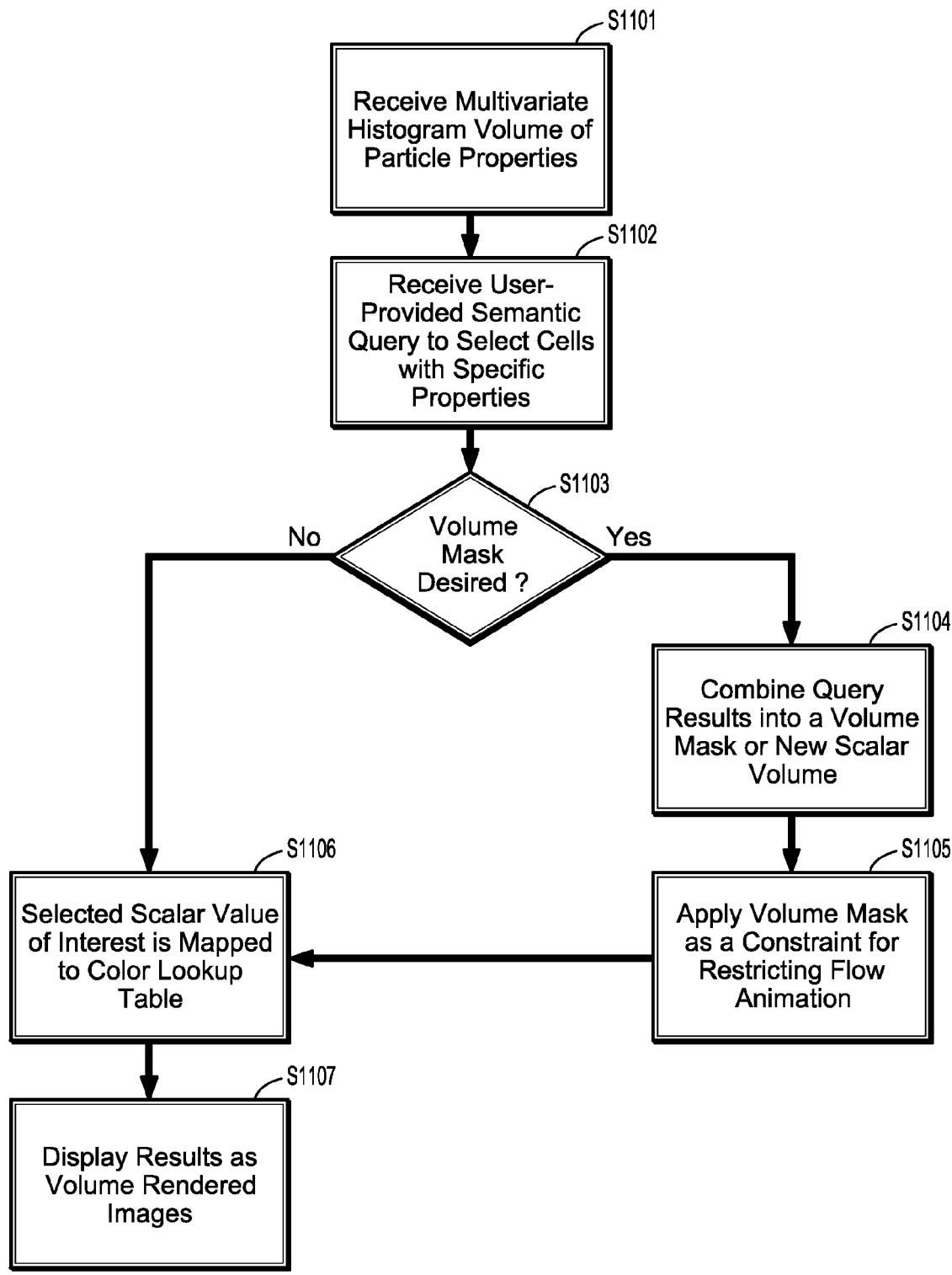
FIG. 11 is a flow chart illustrating an approach for selecting particle properties for volume rendering display in accordance with exemplary embodiments of the present invention.

FIG. 11 is a flow chart illustrating an approach for selecting particle properties for volume rendering display in accordance with exemplary embodiments of the present invention. First, multivariate histogram volume of particle properties may be received (Step S1101). The multivariate histogram volume may be constructed in accordance with the above-described approaches. The multivariate histogram volume may have been constructed to include a plurality of property values and still other property values may be derived from those that are included. A user-provided semantic query may be received and the received query may be used to select cells having specific properties (Step S1102). The semantic query may be provided, for example, using a user-interface that has been designed for the task. The specific properties may be those properties that the user is interested in observing and likewise, the selected cells may be those cells in which the specific properties are non-zero.

Thereafter, it may be determined whether a volume mask is desired (Step S1103). A volume mask may be used to mask out only those regions or data that the user is interested in focusing on. The volume mask may be used, for example, where extraneous display would provide a cluttered appearance and/or would obstruct the interested regions/data.

Where the volume mask is desired (Yes, S1103), query results may be combined in to a volume mask or a new scalar volume (Step S1104). The volume mask may then be applied as a constraint for restricting flow animation (Step S1105). Thereafter, and in the event that no volume mask is desired (No, S1103), a selected scalar value of interest may be mapped to a color lookup table (Step S106). This mapping may permit the data of interest to appear in a particular color that sets it apart from the remainder of the image rendering to draw attention to that data. The results may then be displayed as volume rendered images (Step S1107).

Figure 12:
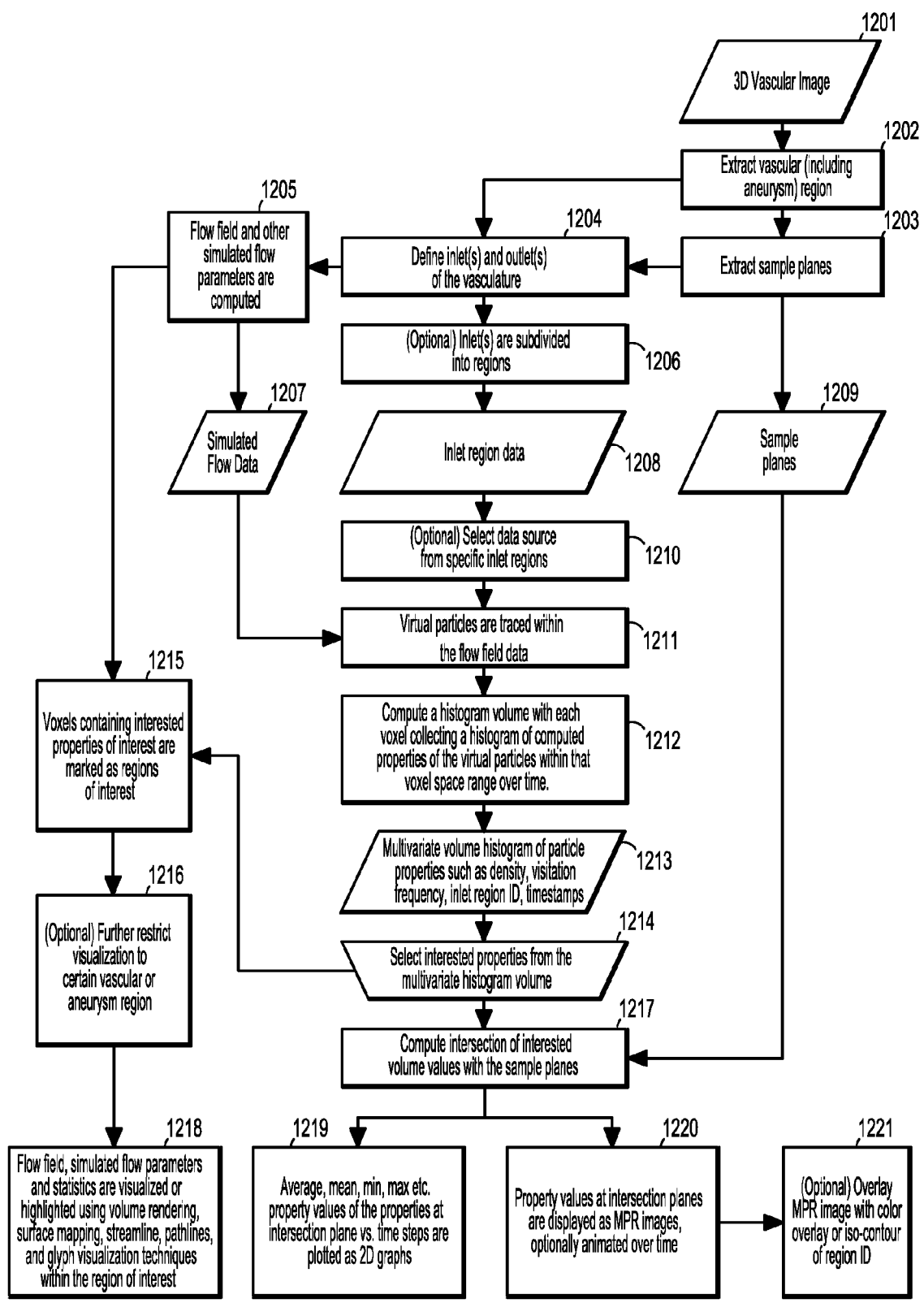
FIG. 12 is a flow chart illustrating an approach for applying histogram volume in vascular flow visualization in accordance with exemplary embodiments of the present invention.

FIG. 12 is a flow chart illustrating an approach for applying histogram volume in vascular flow visualization in accordance with exemplary embodiments of the present invention. The arrows in this figure may illustrate process order, when drawn from rectangular objects, which represent method steps, and may illustrate data flow, when drawn from parallelogram objects, which represent input/output data. The trapezoidal objects may represent steps involving manual input.

The 3D vascular image (1201) may be received as input into the process. A vascular region of interest may then be extracted from the 3D vascular image (1202). This may be a region of interest which may be of particular diagnostic value. For example, the region may include an aneurysm. Sample planes (1209) may then be extracted from the 3D vascular image (1203). The sample planes may include planes of the 3D vascular image of particular interest. The intersection of the vascular region and the sample planes may yield a precise volume of interest.

One or more inlets and outlets of the vasculature may then be defined (1204). The flow field and/or other simulated flow parameters may then be computed (1205). From the defined inlets and outlets, the inlets may be subdivided into regions, where desired (1206), for example, when it is desired to follow the path of particles from their particular starting region within the inlet. Inlet region data (1208) may be collected and used for this purpose. Where desired, data originating from specific inlet regions may be selected (1210). Virtual particles may then be traced within the flow field data (1211). This step may be performed after the flow field is computed (1205) using simulated flow data (1207).

Rather than advecting the traced virtual particles, exemplary embodiments of the present invention may compute a histogram volume with each cell and may collect a histogram of computed properties of the virtual particles within corresponding voxel space range over time (1212).

A user may then manually select desired properties from among the available multivariate volume histogram of particle properties (1214). The properties that the user may from (1213) may include the properties of the multivariate volume histogram as well as properties that are not present within the multivariate histogram but may be derived therefrom. Examples of selectable properties (1213) may include density, visitation frequency, inlet region ID, timestamps, etc. The selected properties may be used to mark cells (voxels) containing properties of interest as belonging to a region of interest (1215). Optionally, visualization may be further restricted to a particular vascular region such as an aneurysm region (1216). From there, volume rendering may be used to illustrate the flow filed and simulated flow parameters and statistics may be visualized or highlighted thereon (1218). Volume rendering may include either two-dimensional or three-dimensional display, and may involve surface mapping, streamline, pathline, and/or glyph visualization techniques, for example, within the region of interest. The user-selected properties (1214) may also or alternatively be used to compute an intersection (1217) of the volume values of interest (1214) and the sample planes (1209). From there, one or more of average, mean, minimum, maximum, etc. property values at the computed intersection may be plotted against time steps as one or more two-dimensional graphs (1219).

Additionally, or alternatively, property values at the calculated intersection may be displayed as MPR images and may be optionally animated over time (1220). The MPR images may be optionally overlaid with colors or iso-contours showing region ID (1221).

Figure 13:
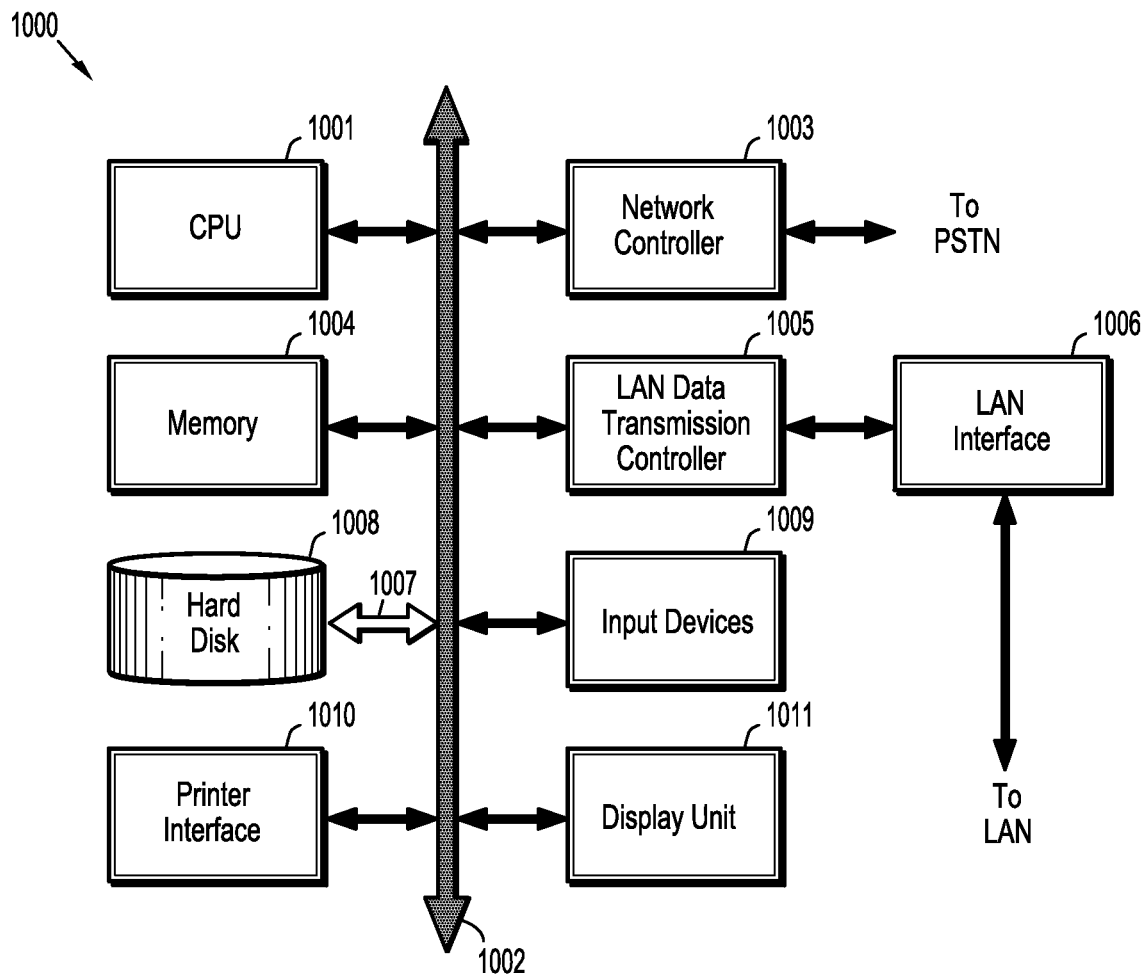
FIG. 13 shows an example of a computer system capable of implementing the method and apparatus according to embodiments of the present disclosure.

FIG. 13 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

As described in detail above, exemplary embodiments of the present invention may utilize multivariate histogram volume that allows for selection of flow visualization based on traced particle property statistics. Such an approach may be computational efficient and may be capable of tracing and visualizing up to infinite number of virtual particles in flow visualization. The computation and storage cost may be independent from the number of particles. Memory requirements associated with the volume histogram may also be significantly reduced by making use of the linked-bins discussed above.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for tracing a plurality of virtual particles through a flow field, comprising:
   receiving a flow field encompassing a flow domain;
   dividing the flow domain into a plurality of cells;
   defining a plurality of virtual particles within the flow domain;
   collecting one or more values for flow properties at each of the plurality of cells;
   generating a histogram for each of the plurality of cells representing the collected one or more flow properties for that corresponding cells, wherein the histogram includes, for each of the one or more flow properties, a plurality of bins defining ranges of property values and a count of virtual particles within that cell that exhibit those properties;
   advecting the histograms for the plurality of cells with respect to the flow field over time; and
   rendering a graphical representation of the plurality of panicles within the flow domain based on the advected histograms for the plurality of cells with a graphics processor.

2. The method of claim 1, wherein the flow field comprises a mathematical description of flow properties observed within the flow domain.

3. The method of claim 2, wherein the flow domain is a blood vessel segment, the flow field is a description of blood flow through the blood vessel segment, and the flow field is acquired using angiography techniques.

4. The method of claim 1, wherein the plurality of cells comprises a uniformly spaced rectilinear cell grid with a Cartesian volume.

5. The method of claim 1, wherein the defining of the plurality of virtual particles comprises creating a simulation of how particles would flow through the flow domain given the flow field.

6. The method of claim 1, wherein the one or more values for flow properties comprise one or more of: particle density, particle speed, particle directions, visitation frequency, particle age, particle origin, or surface collision statistics.

7. The method of claim 1, wherein the generated histogram is a multivariate histogram for storing a plurality of flow properties.

8. The method of claim 1, wherein advecting the histograms comprises calculating how each histogram changes from time step to time step based on the flow field.

9. The method of claim 1, wherein rendering the graphical representation of the plurality of particles comprises generating a 3D flow field simulation.

10. The method of claim 9, wherein the generated 3D flow field simulation is animated over time.

11. The method of claim 1, wherein rendering the graphical representation of the plurality of particles comprises mapping selected scalar values of interest to a color lookup table.

12. The method of claim 11, wherein the selected scalar values includes one or more of an average, mean, minimum, maximum.

13. The method of claim 11, wherein the selected scalar values are plotted as a 2D graph with reference to time steps.

14. The method of claim 1, further comprising displaying the rendered graphical representation of the plurality of particles within the flow domain on a display device.

15. The method of claim 1, wherein the rendering of the graphical representation of the plurality of particles within the flow domain is limited to a subset of particle property values selected based on user input.

16. The method of claim 1, wherein the generated and advected histograms are stored in a linked-bins data structure.

17. The method of claim 1, wherein the size of each of the plurality of cells are set relatively small when greater accuracy is desired and relatively large when greater computational efficiency is desired.

18. A method for tracing a plurality of virtual particles through a flow field, comprising:
   receiving a flow field encompassing a flow domain;
   dividing the flow domain into a plurality of cells;
   establishing a simulation of a plurality of virtual particles placed at an inlet of the flow domain;
   generating a statistical representation for each of the plurality of cells representing one or more flow properties for that corresponding cells, wherein the statistical representation comprises a histogram for each of the plurality of cells representing the collected one or more flow properties for that corresponding cells, wherein the histogram includes, for each of the one or more flow properties, a plurality of bins defining ranges of property values and a count of virtual particles within that cell that exhibit those properties;
   determining how the statistical representation for the plurality of cells change over time as a result of the flow field; and
   rendering a graphical representation of the plurality of particles within the flow domain based on the statistical representation for the plurality of cells over time with a graphics processor.

19. A computer system comprising:
   a processor; and
   a non-transitory, tangible, program storage medium, readable by the computer system, embodying a program of instructions executable by the processor to perform method steps for tracing a plurality of virtual particles through a flow field, the method comprising:
   receiving a flow field encompassing a flow domain;
   dividing the flow domain into a plurality of cells;
   defining a plurality of virtual particles within the flow domain;
   collecting one or more values for flow properties at each of the plurality of cells;
   generating a statistical representation for each of the plurality of cells representing the collected one or more flow properties for that corresponding cells, wherein the statistical representation comprises a histogram for each of the plurality of cells representing the collected one or more flow properties for that corresponding cells, wherein the histogram includes, for each of the one or more flow properties, a plurality of bins defining ranges of property values and a count of virtual particles within that cell that exhibit those properties;

advecting the statistical representation for the plurality of cells with respect to the flow field over time; and rendering a graphical representation of the plurality of particles within the flow domain based on the advected statistical representation for the plurality of cells.

* * * * *